United States Patent
Yau

[15] 3,683,678
[45] Aug. 15, 1972

[54] METHOD AND APPARATUS FOR MOLECULAR WEIGHT MEASUREMENT

[72] Inventor: Wallace W. Yau, Wilmington, Del.

[73] Assignee: E. I. du Pont de Nemours and Company, Wilmington, Del.

[22] Filed: May 3, 1971

[21] Appl. No.: 139,446

[52] U.S. Cl. .................. 73/53, 23/230 R, 210/25
[51] Int. Cl. .............................................. G01n 31/08
[58] Field of Search ...73/53, 61.1 R, 61.1 C; 210/25, 210/31 R, 31 C; 250/218; 23/230 R

[56] References Cited

UNITED STATES PATENTS

| | | |
|---|---|---|
| 3,002,823 | 10/1961 | Flodin et al. .......... 210/31 C X |
| 3,326,875 | 6/1967 | Moore .................... 260/92.8 |
| 3,354,317 | 11/1967 | Gamble et al. ............ 73/53 X |
| 3,536,614 | 10/1970 | Frisque et al. ........... 210/31 C |
| 3,586,626 | 6/1971 | Heitz et al. .............. 210/31 C |
| 3,598,245 | 8/1971 | Determann et al...210/31 C X |

Primary Examiner—Louis R. Prince
Assistant Examiner—Joseph W. Roskos
Attorney—Harry J. McCauley

[57] ABSTRACT

Method and apparatus for rapid measurement of average molecular weight of polymers wherein a specimen is placed in solution and contacted with a solid material into which substantial permeation occurs as a function of molecular size, then determining the average molecular weight as a function of the ratio of as-received and final equilibrium polymer concentrations one to the other.

2 Claims, 8 Drawing Figures

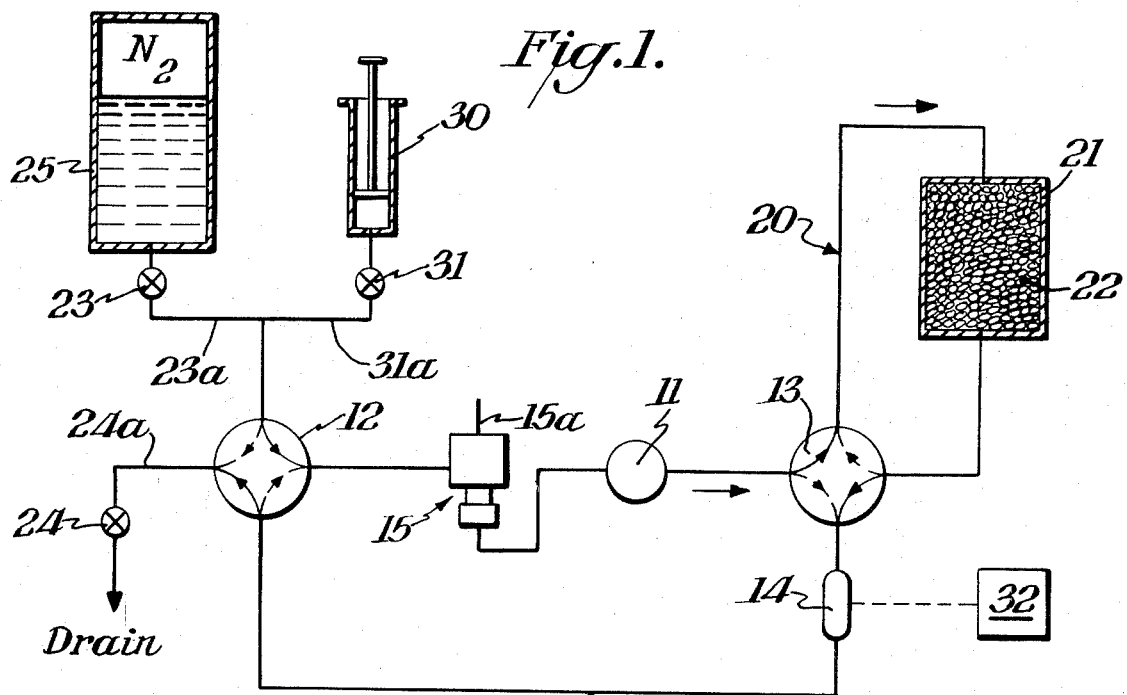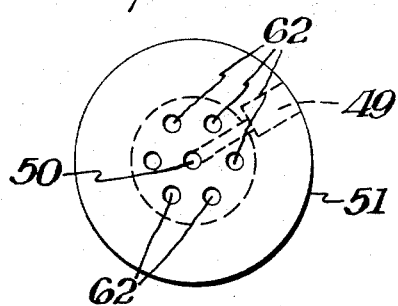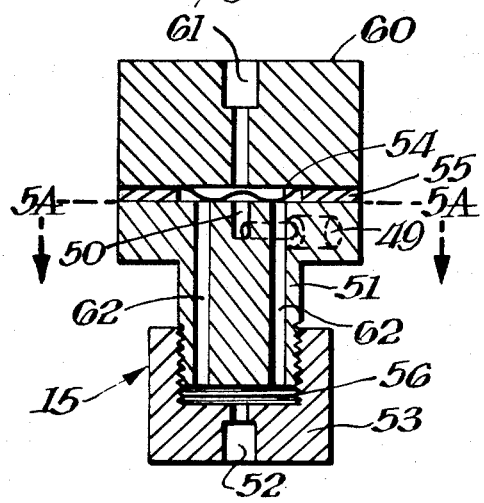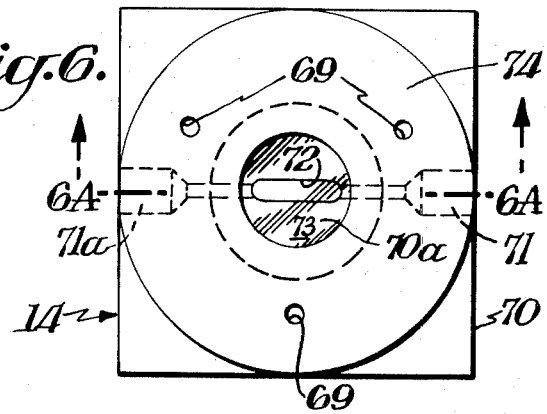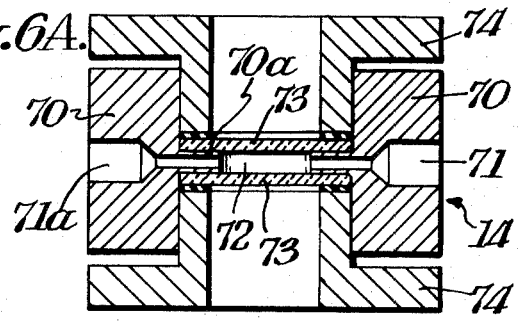

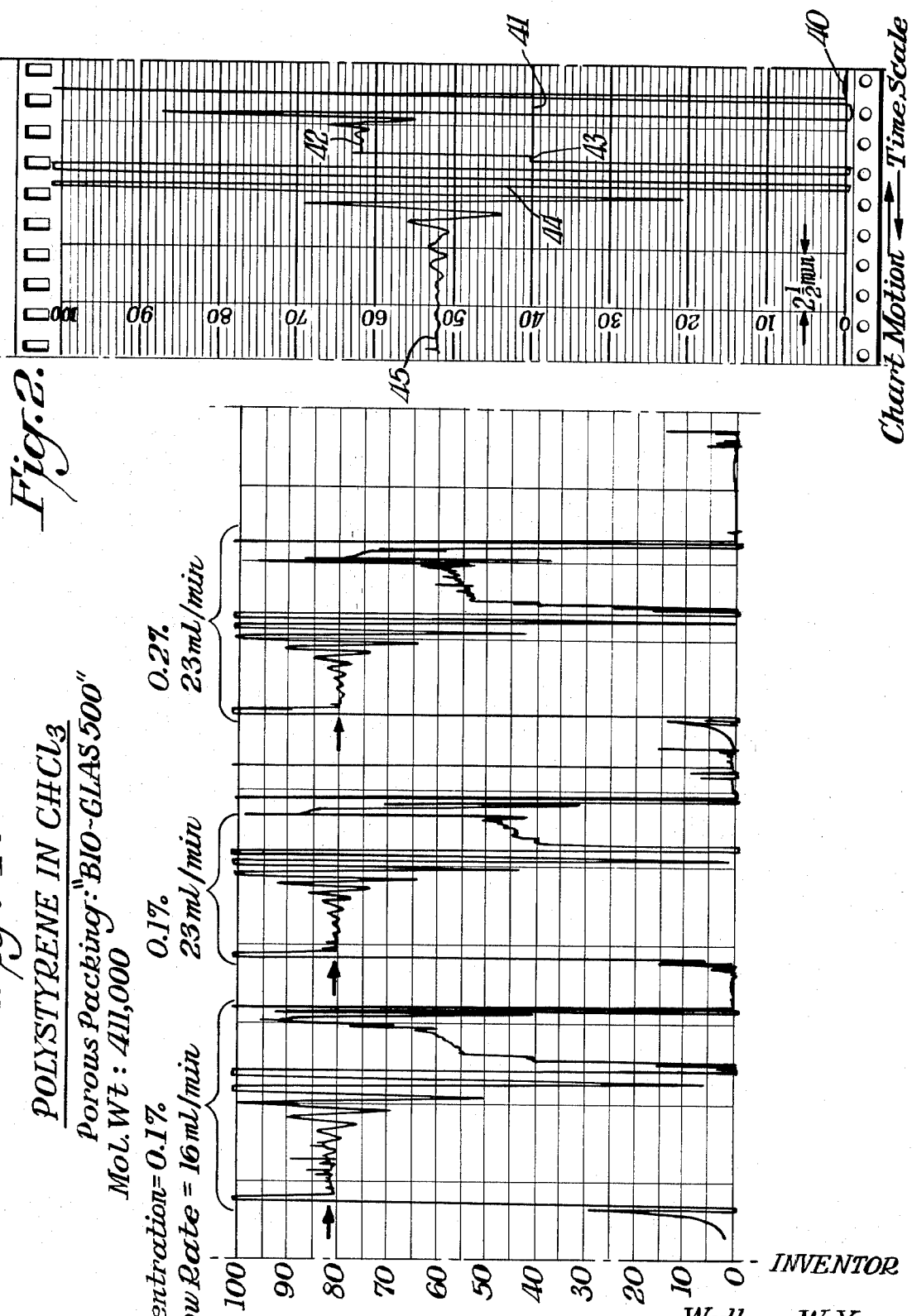

3,683,678

METHOD AND APPARATUS FOR MOLECULAR WEIGHT MEASUREMENT

BRIEF SUMMARY OF THE INVENTION

Generally, this invention consists of a method for determining the average molecular weight of a polymeric material comprising, in sequence, dissolving a representative specimen of the polymeric material in a solvent to form a dilute solution, obtaining an index of the as-dissolved concentration of the polymeric material in the solvent, contacting the dilute solution with a porous material having the property of permeation loading with polymer molecules as a function of molecular size, obtaining an index of the equilibrium concentration of the polymeric material in the solvent after the contacting with the porous material, and ascertaining the average molecular weight of the polymeric material as a function of the ratio, one to the other, of the index of the as-dissolved concentration and the index of the equilibrium concentration, together with apparatus for carrying out the method.

DRAWINGS

The following drawings illustrate a preferred embodiment of the invention, in which:

FIG. 1 is a schematic representation of an apparatus for carrying out the method, FIG. 2 is a reproduction of a typical recorder trace obtained during a molecular weight determination with the apparatus of FIG. 1, FIG. 3 is a calibration curve with plot points indicated for a number of separate molecular weight determinations, FIG. 4 is a reproduction of three different recorder traces obtained in tests made to determine the effects of variances in sample solution concentration and flow rate on apparatus operation, FIG. 5 is a longitudinal sectional view of a preferred design of diaphragm accumulator utilized in the apparatus of FIG. 1, FIG. 5A is a view taken on line 5A—5A of FIG. 5, FIG. 6 is a plan view of a preferred design of analyzer cell utilized in the apparatus of FIG. 1, and FIG. 6A is a longitudinal sectional view taken on line 6A—6A of FIG. 6.

THE PROBLEM

Polymer manufacture and utilization require a knowledge of both molecular weight and molecular weight distribution. This is because important polymer properties, e.g., tensile strength, modulus, dyeability, shrinkage, clarity and other characteristics, are closely related to these parameters.

Many different techniques have been utilized to determine average molecular weight of polymers, including 1. end group analysis which, however, becomes insensitive at high molecular weights,
2. vapor pressure change in a solvent, boiling point elevation, freezing point depression or osmotic pressure, all of which require painstaking measurements of extremely small changes,
3. light scattering (this requires extreme care in sample preparation, since dust or other extraneous material easily obscures the light scattering effect of polymer molecules), and
4. ultracentrifugation, which is the most intricate method of all, often requiring days, or even weeks, to reach equilibrium.

These four methods provide, in principle, absolute measurements, since average molecular weights can be calculated therefrom without reference to calibration by another method.

Methods (1) and (2) provide number-average molecular weights ($\overline{M}_n$), whereas methods (3) and (4) provide a weight-average molecular weight ($\overline{M}_w$). ($\overline{M}_n$ is defined as the weight of the polymer sample divided by the number of molecules in the specimen, whereas $\overline{M}_w$ is defined as the summation of the individual products of the numbers of individual molecules having given molecular weights times the squares of these given molecular weights divided by the weight of the polymer sample.)

A more convenient technique which provides a relative, rather than absolute, value of average molecular weight, comprises measuring solution viscosity, there being a reasonable correlation between viscosity and molecular weight. The viscosity-average molecular weight value ($\overline{M}_\eta$) is usually 10–20 percent lower than ($\overline{M}_w$) for most polymers. However, for acceptable accuracy, and reproducibility of ($\overline{M}_\eta$) values solution concentration must be maintained, and closely duplicated, for each comparative test and viscosity measurements made with temperature control held to about ±0.02° C.

Recently (refer U.S. Pat. No. 3,326,875 and the Journal of Polymer Science, Part A2, page 835 (1964)), gel permeation chromatography (GPC) has afforded a rapid and generally quantitative method for determining the size distribution of molecules in a polymer. Polymer solutions are "fractionated" according to molecular size by passing the polymer solution through a column packed with an inert porous particulate medium (e.g., cross-linked polymer gel, or porous glass beads). Separation as a function of molecular size occurs, depending upon the ease and depth to which each molecular species can diffuse or permeate into the porous bead structure. Thus, the largest molecules penetrate least and are accordingly eluted first, whereas progressively smaller particles follow in inverse time sequence to their individual sizes.

GPC, like viscometry, provides relative rather than absolute values, since calibration is required to provide accurate, quantitative expressions of the molecular size distribution. Furthermore, in GPC, calibration should be performed with standards of the same polymer as the material to be characterized, since the molecular size-weight relationship is not the same for all polymers. Well-characterized polystyrene standards are available commercially (e.g., from Waters Associates, Framingham, Mass., or Dow Physical Research Lab, Midland, Michigan, or Pressure Chemical Co., Pittsburgh, Pa.) and can be used for calibration. Then, when the column is used for another polymer for which standards are not available, molecular weight values may be expressed as polystyrene molecular weight equivalents, if so desired.

In polymer processing there is a great need for rapid molecular weight determination and none of the foregoing methods is satisfactory for the purposes, although in-process viscometry measurement is used with some success. The molecular weight information required for most polymer processing need not be absolute; however, the molecular weight information should accurately indicate changes in molecular weight and/or molecular weight distribution.

It is known that ($\overline{M}_n$) is more sensitive to changes in low molecular weight concentration than to changes in high molecular weight concentration, whereas ($\overline{M}_w$) and ($\overline{M}\eta$) are influenced to a greater extent by high molecular weight concentration change than by low molecular weight concentration change. Thus, these average molecular weight values often are not adequately indicative of significant process changes.

DETAILED DESCRIPTION

Figure 3:
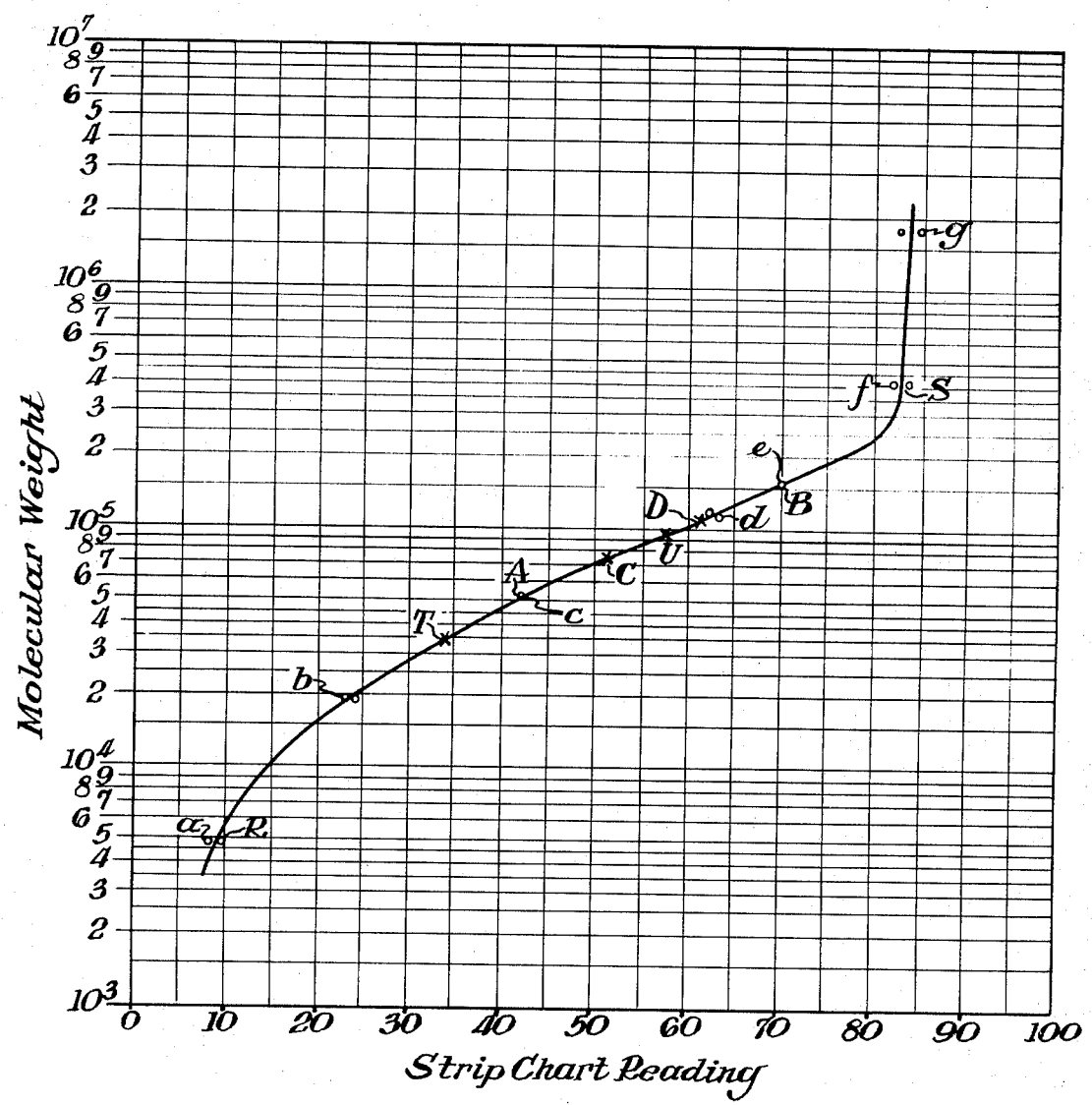

In this invention the size sorting of polymer molecules which occurs in GPC columns is utilized in a unique way for rapid determination of average molecular weight of polymers. Since this size sorting is believed to take place in the pores of the "gel" material when a polymer solution flows through a column packed with such porous material, the very small molecules will enter most of the pore volume, and thus move slowly through the column. Intermediate size molecules will be able to enter some of the pores and thus move through the column at a faster rate, and the very large molecules will be able to enter very few of the pores and thus pass through the column at the fastest rate. Thus, the porous material has the property of permeation loading as a function of molecular size. When a polymer solution is circulated through a column packed with porous material of this kind, the pores of the material will be loaded with polymer molecules dependent on the ability of the molecules to permeate into the porous structure, and thus the packing will be loaded with polymer molecules as a function of molecular size.

I have now found that average molecular weight is speedily determinable by the following general method, involving, in sequence:

a. dissolving the polymer as a dilute solution in a suitable solvent,
b. obtaining an index of the polymer concentration of the as-received solution of (a),
c. mixing the as-received solution of (a) with a suitable porous material having the property of permeation loading with polymer molecules as a function of molecular size, and
d. obtaining an index of the polymer concentration of the solution from (c) after equilibrium has been attained.

The ratio of index (d) to index (b) (or, conversely, index (b) to index (d)) is related to an average molecular weight of the polymer ($\overline{M}$) which, from experimental data, has been found to approximate a geometric average molecular weight ($\overline{M}_g$) over a relatively wide molecular weight range. This is advantageous because ($\overline{M}_g$) is essentially sensitive to changes in ether high or low molecular weight concentrations.

An important advantage of my method is that it is simple in operation, and therefore requires no skilled manipulation, and is rapid, in that individual determinations require only 10–15 minutes time.

Dynamic equilibrium condition is required for completion of a determination; however, this is readily detected and operator error is reduced. Moreover, it has been found that a wide range of initial, as-received polymer concentrations in solution does not significantly affect either the accuracy or reproducibility of the $\overline{M}$ measurements.

Referring to FIG. 1, a preferred embodiment of apparatus according to this invention is shown schematically and comprises a principal flow circuit, indicated generally at 10, in communication, via 4-way flow diversion valve 13, with a subsidiary flow circuit indicated generally at 20. Arrows denote the directions of flow through each circuit.

Circuits 10 and 20 can, typically, be one-sixteenth of an inch internal dia. stainless steel tubing having a solution volume, inclusive of pumps, valves, packed column and the like, of approximately 10–12 ml. each.

Connected in series flow relationship within principal flow circuit 10 is a circulating pump 11, which can typically be a diaphragm pump, such as a variable stroke, piston-operated, diaphragm pump type Model LS–10 of Lapp Insulator Company, Leroy, N.Y., having a pumping rate of 0–40 ml/hr. (Diaphragm pumps are preferred, since they are seal-less and have minimal stagnation volume; however, gear pumps, piston pumps, and the like can be used if desired). Circuit 10 continues through two 4-way valves 12 and 13, which can, typically, be, respectively, a Model V–8 HP and a Model VSV–6 HP of Valco Instrument Company, Houston, Tex., a diaphragm-accumulator 15, which can be constructed according to the design of FIGS. 5 and 5A, and a photometric analyzer cell 14, which can be constructed as detailed in FIGS. 6 and 6A.

Valve 13 is herein referred to as a flow diversion valve and effects operator-controlled communication of principal flow circuit 10 with the subsidiary flow circuit 20, provided in series-flow connection therein with column 21, typically ⅜–1 inch ID by 2–6 inches long, and typically packed with about 15 cm³ of porous particulate permeation medium 22.

Solvent introduction to the apparatus is provided from a solvent supply tank 25, maintained under nitrogen gas pressure as indicated, via valve 23 and conduit 23a running to the 12 o'clock port of valve 12, whereas predissolved polymeric sample introduction is via syringe 30 (20 ml. size), valve 31 and conduit 31a connected to conduit 23a, and thence to valve 12 as hereinbefore described.

Flushing from the system is via line 24a, connected with the 9 o'clock port of valve 12, through valve 24 to the waste drain denoted.

In the examples which follow, as-received and post permeation equilibrium polymer concentration indices were determined by a Du Pont Model 410 Ultraviolet Radiation Analyzer (not shown), the voltage output of which was fed through an operational amplifier to provide fine gain adjustment, thence through a zero suppression circuit to a conventional 0–10 mv strip chart recorder 32. The output of the analyzer can be fed directly to other types of indicators (e.g., a digital voltmeter), however, a strip chart recorder graphically illustrates the rapidity of reaching equilibrium and the short total cycle time required for a measurement.

Although an ultraviolet photometric analyzer was used in these examples, polymer concentration indices can be determined by applying other well known techniques of photometry or refractometry using a wavelength appropriate for the measurement. Sensitivity to concentration changes of the particular polymer solvent system is the prime requisite for analyzer and wavelength choice.

Referring to FIGS. 5 and 5A, there is detailed a preferred design of diaphragm-accumulator 15, which minimizes stagnation volume interfering with good operation.

The assembly is of four-part construction, constituting a crown piece 60 bearing against a spacer ring 55 which, in turn, bears against the top surface of a tail piece 51, these three components being held tightly together by six peripherally disposed machine screws, not shown. Interposed between crown piece 60 and spacer ring 55 is polytetrafluoroethylene diaphragm 54, the upper face of which opposes internally threaded axial passage 61, whereas the lower face opposes axial passage 50 in tail piece 51. Pressurized nitrogen, or other suitable gas, retained within a storage vessel (not detailed), is applied via line 15a, FIG. 1, through passage 61 against the upper face of diaphragm 54.

For solution inflow, passage 50 communicates with radial passage 49, which terminates at its outer extremity in an internally threaded inlet port connection. A plurality of longitudinal passages 62 (in this instance six in number, each typically 1/16-inch dia.) disposed coparallel with passage 50, and equally spaced radially therefrom and angularly with respect to each other, connect passage 50 with chamber 56.

The lower end of tail piece 51 is threaded to receive screw cap 53, the inner face of which is spaced from the lower end of tail piece 51 to define therewith the chamber 56, which communicates centrally with an axial outlet port 52 (typically, 1/16-inch dia.) internally threaded at its exit end.

Referring to FIGS. 6 and 6A, a suitable design of analyzer cell 14 can comprise a block 70 measuring about 1 inch square × ½ inch thick, which is drilled axially to provide bores receiving opposed retainer bushings 74. Enough stock is left centrally of block 70 to provide a relatively thin web 70a, which is milled through to provide an essentially square cross-section transverse flow passage 72 (1/16 × 1/16 × ¼-inch long), which is closed off at top and bottom by quartz sight glasses 73 suitably gasketed and retained in place by bushings 74. The cell is held in fluid-tight assembly by machine screws (not shown) engaging with aligned threaded bores 69 in block 70 and bushings 74. Transverse inlet and outlet connections 71 and 71a in axial alignment with passage 72 communicate with flow circuit 10.

Porous material 22 contained within column 21 can be one, or a mixture of several, of a wide variety of commercially available materials having the property of permeation loading with polymer molecules as a function of the particular molecular size of the polymer whose average molecular weight is sought.

The choice of a porous material is predicated on the compatibility of the solvent and dissolved polymer involved as well as the pore size range required to provide resolution and linearity in the molecular weight range anticipated. In general, inert media, that is, materials devoid of absorptive, adsorptive or other propensities interfering with the permeation mechanism, are operative. Conventional GPC materials are particularly preferred because their pertinent characteristics have already been quantitatively established as a guide to their service in chromatography; however, many other materials can be utilized, if circumstances necessitate.

Table I lists eight typical commercially available GPC bead-form porous materials which can be used for molecular weight measurements according to this invention in the several ranges denoted with the solvents indicated.

In operation, the apparatus is first readied by flushing with fresh solvent of the same kind as that employed to dissolve the polymer in test. This is done (with circulating pump 11 in operation) by setting valves 12 and 13 to open the flow path indicated by the solid arrows within the respective valve enclosures, after which valves 23 and 24 are opened. This permits flow of fresh solvent from reservoir 25, maintained under nitrogen gas pressure, into principal flow circuit 10. Pump 11 circulates the solvent through valve 13 into subsidiary flow circuit 20 and through column 21, thoroughly wetting and flushing the porous material 22 contained therein.

Cleansing solvent flow continues through the solid line arrow course of valve 13 via flow circuit 20, analyzer cell 14, through the second solid arrow course of valve 12 and thence out through valve 24 to the drain. Washing is continued until the apparatus is flushed completely clear of residual solution from a previous measurement, as determined by a base line analyzer reading as hereinafter described.

TABLE I.—POROUS PACKING MATERIAL

| Porous packing | Mfgr. | Type | Molecular weight measurement range | Solvent. |
| --- | --- | --- | --- | --- |
| "Styragel" | Waters Associates, Framingham, Mass. | Highly crosslinked polystyrene | $1,600-40 \times 10^5$ | Nonaqueous. |
| "Biobeads" | Bio-Rad Laboratories, Richmond, Cal. | Lightly crosslinked polystyrene | $1,000-2,700$ | Do. |
| CPG | Corning Glass Works, Corning, New York. | Glass | $300-1.2 \times 10^6$ | Aqueous or non-aqueous. |
| "Bioglas" | Bio-Rad Laboratories, Richmond, Cal. | do | $10^5-12 \times 10^6$ (est.) | Do. |
| "Merckogel" | E. Merck AG, Darmstadt, Germany | Cross-linked polyvinylacetate | $750-1 \times 10^6$ | Non-aqueous. |
| "Porasil" | Waters Associates, Framingham, Mass. | Glass (regular and deactivated) | $6 \times 10^4 - 2 \times 10^6$ | Aqueous or non-aqueous. |
| "Sephadex" G-10 | Pharmacia Fine Chem., Piscataway, New York. | Cross-linked dextran | Up to 700 | Aqueous. |
| "Sephadex" LH-20 | do | Alkylated cross-linked dextran | Up to 2,000 | Non-aqueous. |

When flushing is completed, which, typically, requires about 5 mins., valves 23 and 24 are closed, and valves 12 and 13 are shifted to establish the flow paths therethrough indicated in broken arrow representation, so that subsidiary flow circuit 20 is cut off from communication with principal flow circuit 10. The apparatus is now in condition for a polymer characterization run.

Prior to a determination, the polymer to be tested is preferably first placed in dilute solution with a quantity of the same solvent as used in the flushing and loaded into syringe 30. Sample concentration is usually below 0.5 percent to keep solution viscosity low. Generally, low values of sample concentration are preferred in order to permit operation in the linear range of the analyzers. In addition, getting some polymers into solution at higher concentrations is often difficult.

This polymer solution is first used to displace the cleansing solvent from principal flow circuit 10, which is accomplished by turning off pump 11, opening valve 31 and 24, turning valve 12 back to solid line connection position, and injecting a sufficient quantity of polymer solution from syringe 30, which preferably is proportioned with a volume of about twice that of circuit 10, to replace all liquid in the latter, the displaced liquid exhausting to the drain via line 24a and valve 24. Polymer solution flows through the ball check valves and diaphragm volume of pump 11 while it is in the stationary state. Valves 31 and 24 are then closed, valve 12 returned to the position shown by the broken line arrows and pump 11 started to circulate polymer solution through analyzer cell 14. An index of as-received polymer concentration in the solvent is obtained with the analyzer and the equilibrium value thereof is preserved by strip chart recorder 32.

After equilibrium is reached, pump 11 is stopped momentarily to prevent surging while valve 13 is shifted to the position indicated by solid arrow representation. Pump 11 is started again, now that subsidiary flow circuit 20 is connected in series flow with principal flow circuit 10.

Polymer solution is now cycled through the bed of porous material 22 in column 21. As polymer molecules in the solution diffuse into and out of the pores of bed 22, the concentration of polymer in solution changes in a damped cyclic manner until dynamic equilibrium is reached, a condition easily verified from observation of the recorded signal trace for the final concentration index.

Both as-received and final equilibria are achieved quickly for both index measurements. Thus, when the principal flow circuit is filled with polymer solution, only a few cycles are required to mix any residual solvent which may have been trapped in the loop. Similarly, when subsidiary flow circuit 20 is placed in series connection, it requires only several cycles to mix the volume of solvent therein with the polymer solution from circuit 10. The fact that porous material 22 is already wet with solvent significantly reduces the time required to reach equilibrium concentration.

Diaphragm accumulator 15 hereinbefore described is designed for "through-flow" operation, minimizing the apparatus stagnation volume, which could, otherwise, reduce accuracy by contamination of successive polymer samples with residues from preceding runs. Moreover, smooth flow of circulating liquid is insured by delivery of incoming flow to the underside of diaphragm 54 and draw-off via the six distributed exhaust passages 62, with recombination in chamber 56 and return to the principal flow circuit via outlet port 52. Pressure fluctuations are smoothed out by displacements of diaphragm 54 against the counter pressure of the gas reservoir in communication with the other side of the diaphragm via line 15a connecting with passage 61.

This method of average molecular weight measurement is relative, rather than absolute, and requires calibration. Thus, it does not matter whether the $\overline{M}$ is determined as a ratio of the index of the as-received concentration, $C_i$, to the final equilibrium concentration, $C_f$, or vice-versa. It will be seen by later examples that, when using a strip chart recorder, it is advantageous to express $\overline{M}$ as follows:

1. $\overline{M} = A_1 C_f/C_i$ where $A_1$ is a constant.

The role of the column packed with porous material in determining $\overline{M}$ will be understood by considering a material balance of the system in operation. If the volume of primary loop 10 is expressed as $V_1$, the free volume of secondary loop 20 is $V_2$ (excluding the pore volume of material 22, which is $V_p$) and the permeation loading factor of porous material 22 is p, the material balance is as follows:

2. $C_i V_1 = C_f (V_1 + V_2 + p V_p)$ or
3. $C_f/C_i = (V_1/V_1 + V_2 + p V_p)$

Once the apparatus is set up with any specific packed column, $V_1$, $V_2$, and $V_p$ are constants. It is the permeation loading factor which accounts for a change in $C_f/C_i$ when there is a difference in the molecular size distribution of polymer solutions being analyzed.

If the output of the analyzer is fed to a digital voltmeter, the voltmeter readings would indicate the index, $R_i$, of the as-received concentration, $C_i$, or the index, $R_f$, of the final equilibrium concentration. Since $C_i = a R_i$ and $C_f = a R_f$, where $a$ is a constant, it follows from Equation (1) that:

1a. $\overline{M} = A_1 R_f/R_i$.

Feeding the output of the analyzer into a strip chart recorder, as previously described, provides a graphical illustration of the operation of this system. For example, FIG. 2 is representative of a typical signal trace obtained from recorder 32 during a measurement of average molecular weight conducted on a 0.2 percent solution of a polyethylene sample with chloroform ($CHCl_3$) as the solvent.

As seen in FIG. 2, the chart motion is to the right, so that the progressive reading trace develops in a right-to-left direction. With principal flow circuit 10 filled with solvent at the beginning of the cycle, the base line trace is that denoted 40, the analyzer being set at a high sensitivity range and "zeroing" the recorder.

The sample solution is then injected the pump 11 started to circulate the sample. Due to the high sensitivity setting of the analyzer, it is necessary to use zero suppression during the oscillation period 41, so that, when equilibrium is reached, as shown at 42, the signal is "on scale." This value ($Z_1$) of zero suppression is imposed on the signal for each sample analyzed when reading the as-received index of $C_i$. The chart reading for $C_i$ is then brought to a predetermined value, such as that shown at 43, by adjusting a fine gain control on the signal output, so that $C_i$ is now modified by a constant factor $k$. The chart value at 43 is the index $I_i$ for the as-received polymer concentration, and is thus $kC_i-Z_1$.

Valve 13 is then shifted to connect subsidiary flow circuit 20 with principal flow circuit 10. The addition of circuit 20 introduces a dilution effect requiring a second suppression adjustment $Z_2$ during the signal oscillation period 44. This zero suppression $Z_2$ is noted and is kept constant for all samples when reading the index of the final concentration value $C_f$, which is indicated by the equilibrium chart reading $I_f$ denoted at 45.

The chart value $I_f$ for the index of the final concentration is, therefore, $kC_f-Z_2$.

The described zero suppression and gain adjustment gives good resolution and excellent reproducibility. Zero suppression permits high sensitivity settings for both concentration readings, thus good resolution. Using the gain adjustment to reach a predetermined value for $I_i$, and keeping constant zero offset values makes the $I_f$ value directly related to $\overline{M}$, remembering the relationship of Equation (1):

1. $\overline{M} = A_1 C_f/C_i$, where $A_1$ is a constant, and, since $I_i = kC_i - Z_1$ and $I_f = kC_f - Z_2$
then $C_i = I_i + Z_1/k$ and $C_f = I_f + Z_2/k$
Substitution in Equation (1) gives $$(4) \quad \overline{M} = A_1 \left( \frac{\frac{I_f+Z_2}{k}}{\frac{I_i+Z_1}{k}} \right) = A_1 \left( \frac{I_f+Z_2}{I_i+Z_1} \right)$$

Since $Z_1$ is made constant for all samples and, since $I_i$ is made a constant predetermined value, this expression reduces to 5. $M = A_2 (I_f + Z_2)$, where $A_2$ and $Z_2$ are constants.

The necessity of using the same fine gain setting, k, for both the initial and final concentration measurements is evident from Equation (4).

Equation (5) shows that $\overline{M}$ is then directly related to the chart value $I_f$, which is the measured index of $C_f$ obtained at final equilibrium reading 45, FIG. 2. These chart values 45 (i.e., $I_f$) when plotted vs. molecular weight for several known standard samples establish a calibration curve, such as that plotted in FIG. 3. Then, subsequent measurements of unknown polymer samples give recorder chart values 45, or $I_f$, which can be referred to the calibration curve of FIG. 3 for individual direct determinations of average molecular weight $\overline{M}$.

The calibration curve of FIG. 3 was obtained by using solutions of standard polystyrene samples. In this instance, seven standard polystyrene samples obtained from Pressure Chemical Co., Pittsburgh, Pa. and Dow Physical Research Laboratory, Midland, Michigan, were utilized having the respective molecular weights 4,800 19,800, 51,000, 119,000, 160,000, 411,000 and 1,800,000, each of which had a ratio $\overline{M}_w/\overline{M}_n < 1.10$. These standards were prepared as sample solutions of about 0.2 percent concentration in chloroform as the solvent. The porous material 22 in column 21 was Porasil 400 X (i.e., 400 A pore size designation).

There was thereby obtained the seven composite instrument readings denoted a through g, FIG. 3, providing linear calibration throughout the molecular weight range extending from about 20,000 to about 250,000. The linear range depends on both the average pore size and the pore size range of porous material 22.

The excellent reproducibility is evident in the close grouping of readings obtained for each calibration sample, even though several calibration runs were intentionally made on different days, as indicated. Reproducibility is also remarkably unaffected by changes in initial sample solution concentration or by flow rate through the apparatus. Thus, FIG. 4 is a plot of three different runs made on samples of standard 411,000 molecular weight, $\overline{M}_w/\overline{M}_n < 1.10$, polystyrene dissolved in the designated concentration (i.e., 0.1 percent and 0.2 percent by wt.) in chloroform as solvent. Widely different flow rates of 16 ml./min. and 23 ml./min. were preselected to determine the effects on instrument readings. However, the three recorder 32 traces obtained were virtually identical.

Referring to FIG. 3 again, the operation of this invention is confirmed by $\overline{M}$ determinations for specific polymers deliberately prepared by mixing pairs of polymers of different known molecular weights in preselected proportions.

Thus, point A corresponds to a standard polymer having a known molecular weight of 51,000, whereas point B is that for a standard polymer with known molecular weight of 160,000.

When two parts by weight of polymer A and one part by weight of polymer B are mixed together, the $\overline{M}$ value obtained with the apparatus of FIG. 1 is 74,000, plotted at point C. Reversing the ratio of components by mixing one part of polymer A with two parts of polymer B gives the measured value of $\overline{M} = 110,000$, plotted as point D.

Since mixtures of standard known molecular weight materials were employed in the mixtures of polymers A and B described, it was possible to confirm, by calculation, that, in the linear region of the calibration curve of FIG. 3, the $\overline{M}$ values obtained were, in truth, close approximations of geometric averages $\overline{M}_g$ on the basis of the calculated counterpart values $C = 75,000$ and $D = 109,000$. Although $\overline{M}$ values are true geometric averages only when essentially all molecular sizes which make up the sample are within the linear region, the $\overline{M}$ values obtained for mixtures of components outside the linear region are still useful and indicative of the change in ratio of components.

For example, point R is the instrument reading for a standard polymer of known molecular weight 4,800, whereas point S is the instrument reading for a standard polymer of known molecular weight 411,000, points R and S being outside the linear range of the calibration curve of FIG. 3 and, in fact, at opposite extremes of the plot. Nevertheless, when two parts of polymer R were mixed with one part of polymer S, the $\overline{M}$ value 34,000 corresponding to point T resulted. Reversing the ratio of components and mixing one part R with two parts S gave the measured value $\overline{M} = 95,000$ shown at point U. Calculated geometric averages are 21,000 for T and 94,000 for U.

As hereinbefore mentioned, my molecular weight determinations are relatively speedily made as compared with other methods. A typical time cycle can be measured directly from FIG. 2; however, generally, equilibrium following sample injection requires about 2.5 mins., then dynamic equilibrium during flow through column 21 is reestablished in 8–10 minutes, whereas system flushing requires about 5 minutes, giving a total time per determination of 15 to 18 mins. The apparatus can thus be utilized continuously to obtain 3 or 4 readings/hr., with intervening time devoted to sample preparation or other duties.

What is claimed is:

1. The method of determining the average molecular weight of a polymeric material comprising, in sequence, dissolving a representative specimen of said polymeric material in a solvent to form a dilute solution, obtaining an index of the as-dissolved concentration of said polymeric material in said solvent, contacting said dilute solution with a porous material having the property of permeation loading with polymer molecules as a function of molecular size, obtaining an index of the equilibrium polymer concentration of said polymeric material in said solvent after said contacting with said porous material, and ascertaining said average molecular weight of said polymeric material as a function of the ratio, one to the other, of said index of said as-dissolved concentrations of said polymeric material in said solvent and said index of said equilibrium polymer concentration of said polymeric material in said solvent after said contacting with said porous material.

2. Apparatus for determining the average molecular weight of a polymeric material comprising, in combination, a principal flow circuit conduit provided with means for introducing a dilute solution of said polymeric material in a solvent, pump means circulating said solution around said principal flow circuit conduit, analytical means obtaining an index of the concentration of said polymeric material dissolved in said solvent, a subsidiary flow circuit conduit connected through a flow diversion valve between said pump and said analytical means, means in series flow circuit within said subsidiary flow circuit conduit loaded with a mass of porous material having the property of permeation loading with polymer molecules as a function of molecular size, discharge means communicating with said principal flow circuit conduit for flush removal of solvent and dissolved polymer after each apparatus run, and means for introducing said solvent, free of said polymeric material, to said principal and subsidiary flow circuits as a cleansing flush.

* * * * *